US006343267B1

(12) United States Patent
Kuhn et al.

(10) Patent No.: US 6,343,267 B1
(45) Date of Patent: Jan. 29, 2002

(54) DIMENSIONALITY REDUCTION FOR SPEAKER NORMALIZATION AND SPEAKER AND ENVIRONMENT ADAPTATION USING EIGENVOICE TECHNIQUES

(75) Inventors: Roland Kuhn, Santa Barbara; Patrick Nguyen, Isla Vista; Jean-Claude Junqua, Santa Barbara, all of CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/148,753

(22) Filed: Sep. 4, 1998

Related U.S. Application Data

(63) Continuation-in-part of application No. 09/070,208, filed on Apr. 30, 1998, and a continuation-in-part of application No. 09/070,054, filed on Apr. 3, 1998.

(51) Int. Cl.⁷ .............................................. G10L 19/08
(52) U.S. Cl. ...................................................... 704/222
(58) Field of Search ................................ 704/231, 258, 704/256, 236, 240

(56) References Cited

U.S. PATENT DOCUMENTS

| 4,718,088 A | 1/1988 | Baker et al. |
| 4,817,156 A | 3/1989 | Bahl et al. |
| 4,829,577 A | 5/1989 | Kuroda et al. |
| 4,903,035 A | 2/1990 | Kropielnicki et al. |
| 5,046,099 A | 9/1991 | Nishimura |

(List continued on next page.)

FOREIGN PATENT DOCUMENTS

| EP | 0953968 | 11/1999 |
| EP | 0 984 429 A3 | 11/2000 |

OTHER PUBLICATIONS

Feng, "Speaker Adaptation Based on Spectrla Normalization and Dynamic HMM Parameter Adaptation", IEEE, 1995.*
McDonough et al, "Speaker Adapted Training on the Switchboard Corpus", ICASSP–1997, Apr. 24, 1997.*
Gauvain et al, "Improved acoustic modeling with Bayesian Learning", ICASSP Mar. 23, 1992.*
Kuhn et al, "Eigenfaces and eigenvoices: dimensionality reduction for specialized pattern recognition", IEEE 1998 Second Workshop on Multimedia Signal Processing, Dec. 07, 1998.*

(List continued on next page.)

Primary Examiner—Fan Tsang
Assistant Examiner—Michael N. Opsasnick
(74) Attorney, Agent, or Firm—Harness, Dickey & Pierce, P.L.C.

(57) ABSTRACT

A set of speaker dependent models or adapted models is trained upon a comparatively large number of training speakers, one model per speaker, and model parameters are extracted in a predefined order to construct a set of supervectors, one per speaker. Dimensionality reduction is then performed on the set of supervectors to generate a set of eigenvectors that define an eigenvoice space. If desired, the number of vectors may be reduced to achieve data compression. Thereafter, a new speaker provides adaptation data from which a supervector is constructed by constraining this supervector to be in the eigenvoice space based on a maximum likelihood estimation. The resulting coefficients in the eigenspace of this new speaker may then be used to construct a new set of model parameters from which an adapted model is constructed for that speaker. The adapted model may then be further adapted via MAP, MLLR, MLED or the like. The eigenvoice technique may be applied to MLLR transformation matrices or the like; Bayesian estimation performed in eigenspace uses prior knowledge about speaker space density to refine the estimate about the location of a new speaker in eigenspace.

32 Claims, 8 Drawing Sheets

U.S. PATENT DOCUMENTS

| | | | |
|---|---|---|---|
| 5,050,215 A | | 9/1991 | Nishimura |
| 5,127,055 A | | 6/1992 | Larkey |
| 5,150,449 A | | 9/1992 | Yoshida et al. |
| 5,170,432 A | | 12/1992 | Hackbarth et al. |
| 5,233,681 A | * | 8/1993 | Bahl et al. ............... 704/201 |
| 5,278,942 A | * | 1/1994 | Bahl et al. ............... 704/201 |
| 5,280,562 A | * | 1/1994 | Bahl et al. ............... 704/201 |
| 5,293,584 A | * | 3/1994 | Brown et al. ............. 704/277 |
| 5,375,173 A | | 12/1994 | Sanada et al. |
| 5,473,728 A | | 12/1995 | Luginbuhl et al. |
| 5,522,011 A | * | 5/1996 | Epstein et al. ........... 704/222 |
| 5,579,436 A | | 11/1996 | Chou et al. |
| 5,617,486 A | | 4/1997 | Chow et al. |
| 5,651,094 A | | 7/1997 | Takagi et al. |
| 5,664,059 A | | 9/1997 | Zhao |
| 5,737,723 A | | 4/1998 | Riley |
| 5,778,342 A | | 7/1998 | Erell et al. |
| 5,787,394 A | | 7/1998 | Bahl et al. |
| 5,793,891 A | | 8/1998 | Takahashi et al. |
| 5,794,192 A | | 8/1998 | Zhao |
| 5,806,029 A | | 9/1998 | Buhrke et al. |
| 5,812,975 A | | 9/1998 | Kormori et al. |
| 5,825,978 A | * | 10/1998 | Digalalkis et al. ......... 704/256 |
| 5,839,105 A | | 11/1998 | Ostendorf et al. |
| 5,842,163 A | * | 11/1998 | Weintraub ............... 704/240 |
| 5,864,810 A | * | 1/1999 | Digilakis et al. .......... 704/255 |
| 5,890,114 A | | 3/1999 | Yi |
| 5,895,447 A | | 4/1999 | Ittycheriah et al. |

OTHER PUBLICATIONS

Abrash et al, "Acoustic Adaptation Using nonlinear transformations of HMM Parameters", ICASSP May 7, 1996.*

Zhao, "An Acoustic–phonetic–based speaker adaptation technique for improving speaker independent continuous speech recoginition", IEEE Speech and Audio Processing, Jul. 1994.*

Cox et al, "Simultaneous Speaker Normalisation and utternace labelling using Bayesian/neural net techniques", ICASSP Apr. 3, 1990.*

Digalakis et al, "Rapid speech Recognizer Adatation to New Speakers", IEEE Proceedings on Acoustics, Speech, and Signal Processing, Mar. 19, 1999.*

V. Digalakis, et al., Rapid speech recognizer adaptation to new speakers, Tech. Univ. of Crete, Chania, Greece, pp. 765–768, vol. 2, Mar. 1999.

S.J. Cox, et al., Simultaneous speaker normalisation and utterance labelling using Bayesian/neural net techniques, Brisish Telecom Res. Lab., Ipswich, UK, pp. 161–164, vol. 1, Apr. 1990.

Yunxin Zhao, an acoustic–phonetic–based speaker adaptation technique for improving speaker–independent continuous speech recognition, Speech technol. Lab., Panasonic Technol. Inc., Santa Barbara, CA, USA, pp. 380–394, vol. 2, Jul. 1994.

V. Abrash et al., Acoustic adaptation using nonlinear transformations of HMM parameters, Speech Res. & Technol. Lab., SRI Int., Menlo Park, CA, USA, pp. 729–732, vol. 2, May 1996.

R. Kuhn, et al., Eigenfaces and eigenvoices: dimensionality reduction for specialized pattern recognition, Panasonic Technol.–STL, Santa Barbara, CA, USA, pp. 71–76, Dec. 1998.

J.–L. Gauvain, et al., Improved acoustic modeling with Bayesian learning, AT&T Bell Labs., Murray Hill, NJ, USA, pp. 481–484, vol. 1, Mar. 1992.

Ming–Whei Feng, Speaker Adaptation Based on Spectral Normalization and Dynamic HMM Parameter Adaptation, GTE Laboratories Inc., IEEE, 1995, pp. 704–707.

J. McDonough, et al., Speaker–adapted training on the Switchboard Corpus, BBN Syst. & Technols., Cambridge, MA, USA, pp. 1059–1062, vol. 2, Apr. 1997.

Brian Mak, et al., Phone Clustering Using the Bhattacharyya Distance, Center for Spoken Language Understanding, Oregon Graduate Institute of Science and Technology.

W. Chou, et al., Segmental GPD Training of HMM Based Recognizer, AT&T Bell Laboratories, IEEE, Sep. 1992, pp. I–473–I–476.

Alejandro Acero, et al., Speaker and Gender Normalization for Continuous–Density Hidden Markov Models, Microsoft Corporation, IEEE, Mar. 1996, pp. 342–345.

Ariane Lazarides, et al., Improving Decision Trees for Acoustic Modeling, Locus Speech Corporation, pp. 1053–1056.

Roland Kuhn, et al., Improved Decision Trees for Phonetic Modeling, Centre de recherche informatique de Montreal, IEEE, May 1995, pp. 552–555.

Yunxin Zhao, Overcoming Speaker Variability in Automatic Speech Recognition, The Speaker Adaptation Approach, pp. 191–209.

Chapters 9 and 10 of Talker Variability in Speech Processing, pp. 167–189, Academic Press, 1997.

* cited by examiner

DIMENSIONALITY REDUCTION FOR SPEAKER NORMALIZATION AND SPEAKER AND ENVIRONMENT ADAPTATION USING EIGENVOICE TECHNIQUES

CROSS-REFERENCE TO RELATED APPLICATION

This is a continuation-in-part of U.S. patent application Ser. No. 09/070,208 filed on Apr. 30, 1998, entitled SPEAKER AND ENVIRONMENT ADAPTATION BASED ON EIGENVOICES and of U.S. patent application Ser. No. 09/070,054 Apr. 3, 1998, entitled MAXIMUM LIKELIHOOD METHOD FOR FINDING AN ADAPTED SPEAKER MODEL IN EIGENVOICE SPACE.

BACKGROUND AND SUMMARY OF THE INVENTION

The present invention relates generally to speech recognition and more particularly to speaker adaptation whereby the parameters of a speech recognition model are revised to better recognize the speech of a new speaker.

Speech recognition systems may be speaker dependent or speaker independent. Speaker dependent systems are trained to understand what a single individual says, by being given a large number of examples of words uttered by that individual (these examples are called the "training data"). Speaker dependent systems tend to be very accurate for the individual they are trained on, and inaccurate for everybody else. Speaker independent systems are designed to be used by anybody who speaks the language of the application; typically, they are trained on data from many different people. The error rate for a speaker independent system, carrying out recognition on a speaker not in the training data, is roughly two to three times higher than the error rate for a comparable speaker dependent system carrying out recognition on the speaker it is trained on.

In an effort to improve performance, many speech recognition systems include facilities for performing speaker adaptation, whereby the speech recognition system is adjusted during use to reduce the error rate. There are basically three speaker adaptation approaches described in the current technical literature. These are:

(1) Speaker normalization (also called "transformation")—observations of the digitized signal generated by the new speaker feature vectors are transformed to resemble more closely observations from a reference speaker, for whom a speaker dependent system has been trained. In some instances the transformation is in the opposite direction: a reference pattern is transformed to resemble the data from the new speaker more closely.

(2) Speaker clustering—observations of the new speaker are used to select a cluster of training speakers; each cluster is associated with a complete set of Hidden Markov Models (HMMs) trained only on the speakers in this cluster. Once the cluster most suitable for the speaker has been chosen, recognition is carried out using only HMMs from this cluster.

(3) Model adaptation—certain HMM parameters are updated to reflect aspects of the adaptation data. The two most popular model adaptation techniques are maximum a posteriori estimation (MAP) and maximum likelihood linear regression (MLLR).

While each of these adaptation techniques has proven to be beneficial, none is without some drawback. Generally speaking, the more effective adaptation techniques tend to require significant computational resources and also require a significant training effort on the part of the individual speaker.

The present invention brings an entirely new technique with which to carry out speaker normalization and speaker and environment adaptation. The technique enables an initially speaker independent recognition system to quickly attain a performance level on new speakers and new acoustic environments that approach speaker dependent systems, without requiring large amounts of training data for each new speaker. We call our technique "eigenvoice adaptation." We have discovered that eigenvoice adaptation can be applied in a variety of different contexts, as will be illustrated herein through some specific examples.

In general, eigenvoice adaptation involves an advantageous dimensionality reduction that can greatly improve the speed and efficiency at which speaker and environment adaptation is performed. Dimensionality reduction refers to a mapping of high-dimensional space onto low-dimensional space. A variety of different techniques may be used to effect dimensionality reduction. These include Principal Component Analysis (PCA), Linear Discriminant Analysis (LDA), Factor Analysis (FA), Singular Value Decomposition (SVD) and other transformations that apply reduction criteria based on variance.

Unlike other adaptation techniques described in the literature, our eigenvoice adaptation techniques apply dimensionality reduction to a set of complete speaker models in order to find basis vectors spanning the space of these speaker models. By way of illustration, a large collection of speaker models is analyzed in an offline step using dimensionality reduction to yield a set of eigenvectors that we call "eigenvoice vectors" or "eigenvoices." This offline step is fairly computationally intensive, although it has to be performed only once. After that, each time the speech recognition system is used, it carries out a computationally inexpensive operation on adaptation data obtained from the new speaker, to obtain a vector in the space spanned by the eigenvoices. This new vector gives the adapted model for the new speaker.

Part of the power of the invention derives from the eigenvoice representation of the collective set of training speakers and of the new individual speaker for which the recognition system is being adapted. In other words, the eigenspace developed during the dimensionality reduction step represents the collective speech traits of all the training speakers. The individual eigenvectors that define this n-dimensional space each contain different information and may be represented, for example, as members of an ordered list or array.

Computational burden is significantly reduced with the present invention because the eigenvectors are orthogonal, allowing subsequent computations to be performed by solving a set of linear equations that a computer can calculate quite readily.

Placing a new speaker within eigenspace can be accomplished a number of different ways. Although simple geometric projection can be used to place the new speaker into eigenspace, we have developed an improved technique that we call Maximum Likelihood Eigenvoice Decomposition (MLED) for placing the new vector into the space spanned by the eigenvoices. The maximum likelihood technique involves constructing a probability function based on the observation data from the new speaker and also based on the knowledge of how the Hidden Markov Models are constructed. Using this probability function, a maximum likelihood vector is obtained by taking derivatives and finding the local maxima. This maximum likelihood vector is thus inherently constrained within the space spanned by the eigenvoices and is a good representation within that space for the new speaker given the available input speech data.

Our eigenvoice adaptation techniques give superior results when a good training set of accurate speaker-dependent models is used as the basis for dimensionality reduction. Therefore, according to one aspect of the invention the speaker-dependent models may be obtained and enhanced prior to dimensionality reduction using auxiliary adaptation techniques. Such techniques include Maximum A Posteriori estimation (MAP) and other transformation-based approaches, such as Maximum Likelihood Linear Regression (MLLR).

According to another aspect of the invention, the eigenvoice adaptation technique is applied to develop an initial adapted model and this model is then further improved using auxiliary adaptation techniques, such as those described above. Often the best results may be obtained by applying the MLED technique first and then one of these auxiliary adaptation techniques.

The eigenvoice adaptation techniques discussed so far have involved dimensionality reduction applied to a collective set of training speakers. Yet another aspect of the invention involves application of dimensionality reduction to the set of transformation matrices resulting from a transformation-based adaptation technique such as MLLR. In this approach, each training speaker is used to estimate a set of transformation matrices from a speaker-independent model (using MLLR, for example). The set of transformation matrices for each training speaker is then vectorized (turned into a high-dimensional supervector). A dimensionality reduction technique is then applied to the set of supervectors to yield a low-dimensional set of eigenvectors we call "eigentransform vectors" or "eigentransforms."

To adapt to a new speaker quickly, the system assumes the new speaker's transformation matrices are located in the subspace spanned by the eigentransforms and then applies the resulting transforms to the speaker independent model.

The dimensionality-reducing jump into eigenspace affords considerable flexibility and computational economy. We have found, for example, that statistical processing techniques may be applied in the low-dimensional eigenspace itself. Therefore, in accordance with another aspect of the invention, a statistical process such as Bayesian estimation may be performed in eigenspace as a way of better locating where to place a new speaker within eigenspace. Prior knowledge (from the training speakers, for example) about what areas of speaker space are densely or thinly populated is used to refine estimates of where to locate the new speaker within eigenspace.

In practical terms, the eigenvoice adaptation techniques described here will allow construction of a robust adapted model based on a very short, and potentially incomplete, training session. These techniques thus lend themselves to speaker and environment adaptation applications where a large quantity of adaptation data may not be available. For example, the techniques would work well in a speech-enabled interactive marketing system where the new speaker responds by telephone to system navigation prompts and the system adapts to the new speaker automatically as the speaker proceeds to navigate through the system to place an order.

For a more complete understanding of the invention, its objects and advantages, refer to the following specification and to the accompanying drawings.

DESCRIPTION OF THE PREFERRED EMBODIMENT

To better understand the speaker adaptation technique of the invention, a basic understanding of the speech recognition system will be helpful. Most present day speech recognizers employ Hidden Markov Models (HMMs) to represent speech. The Hidden Markov Model is a modeling approach involving state diagrams. Any speech unit (such as a phrase, word, subword, phoneme or the like) can be modeled, with all knowledge sources included in that model. The HMM represents an unknown process that produces a sequence of observable outputs at discrete intervals, the outputs being members of some finite alphabet (corresponding to the predefined set of speech units). These models are called "hidden" because the state sequence that produced the observable output is not known.

Figure 1:
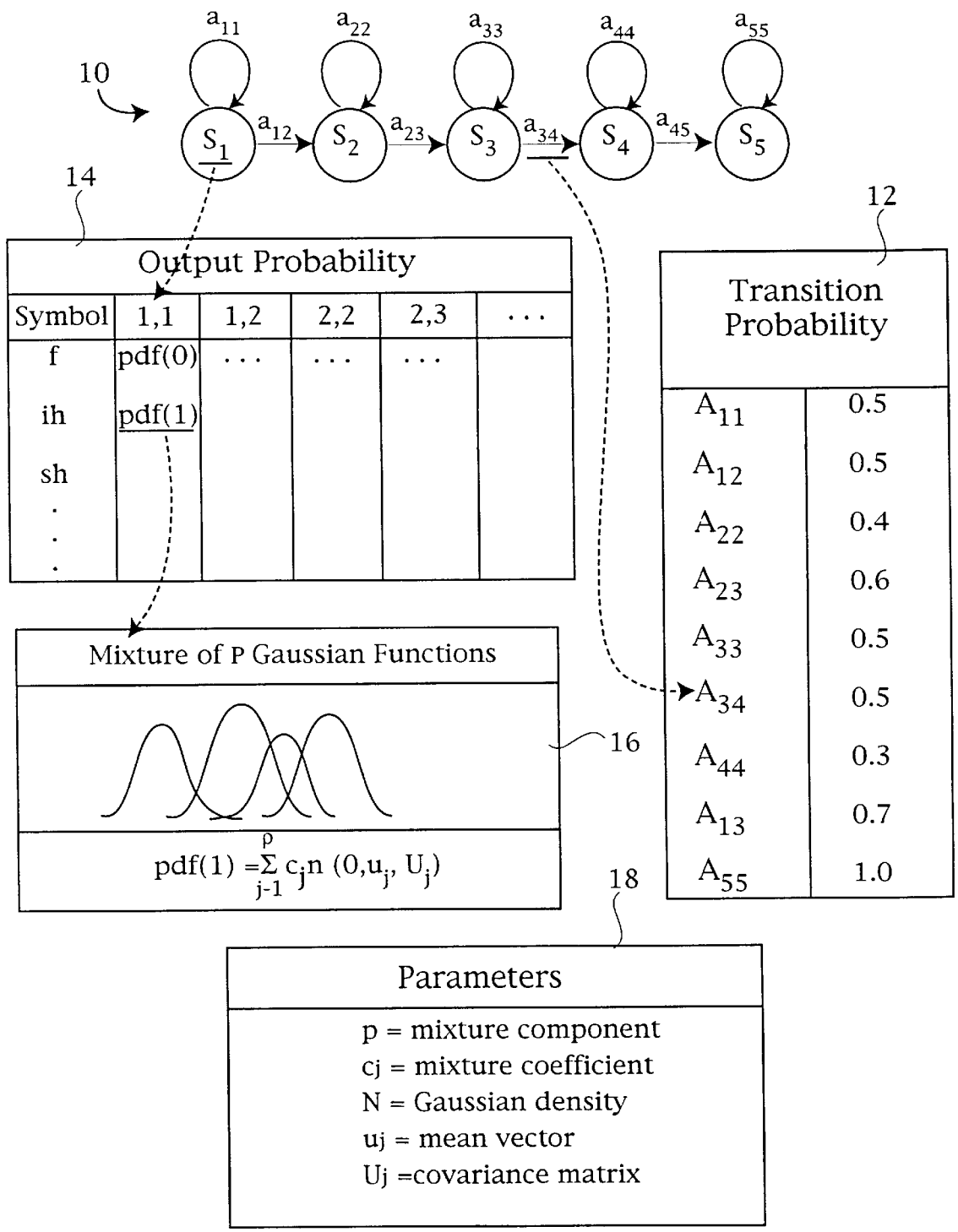
FIG. 1 illustrates an exemplary Hidden Markov Model (HMM), useful in understanding the invention.

As illustrated in FIG. 1, an HMM 10 is illustrated by a set of states ($S_1, S_2 \ldots S_5$), vectors that define transitions between certain pairs of states, illustrated as arrows in FIG. 1, and a collection of probability data. Specifically, the Hidden Markov Model includes a set of transition probabilities 12 associated with the transition vectors and a set of output probabilities 14 associated with the observed output at each state. The model is clocked from one state to another at regularly spaced, discrete intervals. At clock-time, the model may change from its current state to any state for which a transition vector exists. As illustrated, a transition can be from a given state back to itself.

The transition probabilities represent the likelihood that a transition from one state to another will occur when the model is clocked. Thus, as illustrated in FIG. 1, each transition has associated with it a probability value (between 0 and 1). The sum of all probabilities leaving any state equals 1. For illustration purposes, a set of exemplary transition probability values has been given in transition probability Table 12. It will be understood that in a working embodiment these values would be generated by the training data, with the constraint that the sum of all probabilities leaving any state equals 1.

Every time a transition is taken, the model can be thought of as emitting or outputting one member of its alphabet. In the embodiment illustrated in FIG. 1, a phoneme-based speech unit has been assumed. Thus the symbols identified in output probability Table 14 correspond to some of the phonemes found in standard English. Which member of the alphabet gets emitted upon each transition depends on the output probability value or function learned during training. The outputs emitted thus represent a sequence of observations (based on the training data) and each member of the alphabet has a probability of being emitted.

In modeling speech, it is common practice to treat the output as a sequence of continuous vectors as opposed to a sequence of discrete alphabet symbols. This requires the output probabilities to be expressed as continuous probability functions, as opposed to single numeric values. Thus HMMs are often based on probability functions comprising one or more Gaussian distributions. When a plurality of Gaussian functions are used they are typically additively mixed together to define a complex probability distribution, as illustrated at 16.

Whether represented as a single Gaussian function or a mixture of Gaussian functions, the probability distributions can be described by a plurality of parameters. Like the transition probability values (Table 12) these output probability parameters may comprise floating point numbers. Parameters Table 18 identifies the parameters typically used to represent probability density functions (pdf) based on observed data from the training speakers. As illustrated by the equation in FIG. 1 at Gaussian function 16, the probability density function for an observation vector O to be modeled is the iterative sum of the mixture coefficient for each mixture component multiplied by the Gaussian density N, where the Gaussian density has a mean vector $u_j$ and covariance matrix $U_j$ computed from the cepstral or filter bank coefficient speech parameters.

The implementation details of a Hidden Markov Model recognizer may vary widely from one application to another. The HMM example shown in FIG. 1 is intended merely to illustrate how Hidden Markov Models are constructed, and is not intended as a limitation upon the scope of the present invention. In this regard, there are many variations on the Hidden Markov Modeling concept. As will be more fully understood from the description below, the eigenvoice adaptation technique of the invention can be readily adapted to work with each of the different Hidden Markov Model variations, as well as with other parameter-based speech modeling systems.

Constructing the Eigenvoice Space

Figure 2:
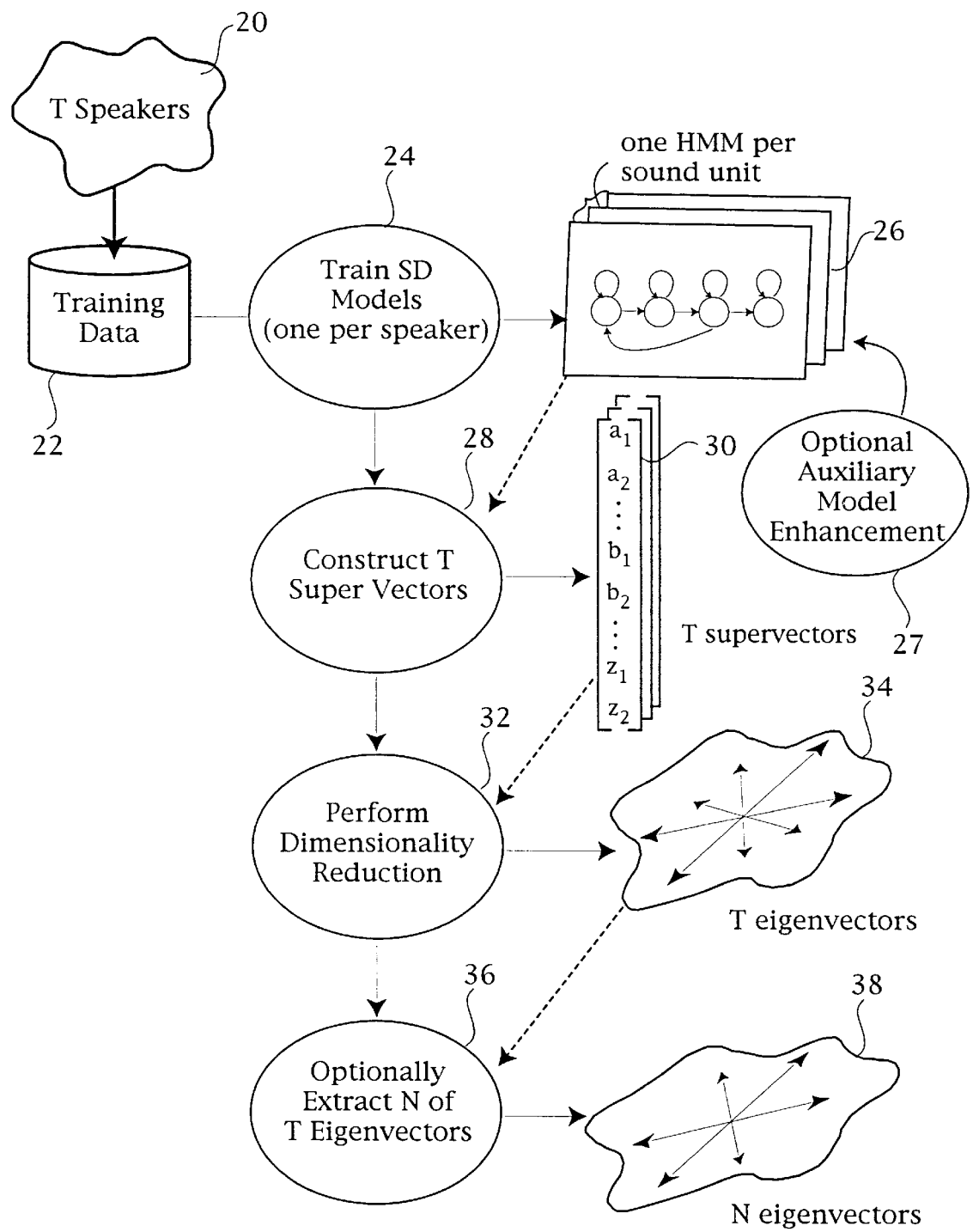
FIG. 2 is a data flow diagram illustrating how to construct an eigenspace from a plurality of training speakers.

The process for constructing an eigenspace to represent a plurality of training speakers is illustrated in FIG. 2. The illustration assumes a number T of training speakers 20 provide a corpus of training data 22 upon which the eigenspace will be constructed. Preferably, a reasonably large number of speakers (on the order of 100 to 200) provide the training data. These training data are then used to train a speaker dependent (SD) model as illustrated at 24. One model per speaker is constructed at step 24, with each model representing the entire inventory of sound units that is to be understood by the recognition system. In accordance with the description provided with FIG. 1, above, each model can be a set of HMMs, one HMM for each sound unit. This is illustrated in FIG. 2 at 26.

Superior results are achieved where the training set represents accurate speaker-dependent models. Therefore, if desired, the speaker-dependent models may be enhanced using auxiliary adaptation techniques. Such techniques include Maximum A Posteriori estimation (MAP) and other transformation-based approaches, such as Maximum Likelihood Linear Regression (MLLR). This optional auxiliary adaptation processing is illustrated in FIG. 2 at 27 Enhancing the speaker-dependent models in this way is particularly advantageous when constructing large vocabulary applications, where the amount of training data per parameter for a given speaker may be low.

After all training data from T speakers have been used to train the respective speaker dependent models, a set of T supervectors is constructed at 28. Thus there will be one supervector 30 for each of the T speakers. The supervector for each speaker comprises an ordered list of parameters (typically floating point numbers) corresponding to at least a portion of the parameters 18 of the Hidden Markov Models for that speaker. Parameters corresponding to the sound units are included in the supervector for a given speaker. The parameters may be organized in any convenient order. The order is not critical; however, once an order is adopted it must be followed for all T speakers.

The ordered Hidden Markov Model parameters are then concatenated to form the supervector. The choice of which HMM parameters to include in the supervector may depend on the available processing power. We have found that constructing supervectors from the Gaussian means gives good results. If greater processing power is available, the supervectors may also include other HMM parameters, such as the transition probabilities (Table 12, FIG. 1) or the Covariance matrix parameters (parameters 18, FIG. 1). Naturally, if the Hidden Markov Models generate discrete outputs (as opposed to probability densities) then these output values may be used to comprise the supervector.

After supervectors have been constructed for each of the training speakers, dimensionality reduction is performed at step 32. Dimensionality reduction is effected by mapping of high-dimensional space onto low-dimensional space. A variety of different techniques may be used to effect dimensionality reduction. These include Principal Component Analysis (PCA), Linear Discriminant Analysis (LDA), Factor Analysis (FA), Independent Component Analysis (ICA), Singular Value Decomposition (SVD) and other transformations that apply reduction criteria based on variance.

More specifically, the class of dimensionality reduction techniques useful in implementing the invention is defined as follows. Consider a set of T training supervectors obtained from speaker-dependent models for speech recognition. Let each of these supervectors have dimension V; thus, we can denote every supervector as $X=[x1, x2, \ldots, xV]^T$ (a V*1 vector). Consider a linear transformation M that can be applied to a supervector (i.e. to any vector of dimension V) to yield a new vector of dimension E (E is less than or equal to T, the number of training supervectors); each transformed vector can be denoted $W=[w1, w2, \ldots, wE]^T$. The values of the parameters of M are calculated in some way from the set of T training supervectors.

Thus, we have the linear transformation $W=M*X$. M has dimension E*V, and W has dimension E*1, where E<=T; for a particular set of T training supervectors, M will be constant. Several dimensionality reduction techniques may be used to calculate a linear transformation M from a set of T training supervectors such that W has dimension E<=T.

Examples include Principal Component Analysis, Independent Component Analysis, Linear Discriminant Analysis, Factor Analysis, and Singular Value Decomposition. The invention may be implemented with any such method (not only those listed) for finding such a constant linear transformation M in the special case where the input vectors are training supervectors derived from speaker-dependent modeling, and where M is used to carry out the aforementioned technique.

Dimensionality reduction upon T supervectors yields T eigenvectors, as at 34. Thus, if 120 training speakers have been used the system will generate 120 eigenvectors. These eigenvectors define what we call eigenvoice space or eigenspace.

The eigenvectors that make up the eigenvoice space contain different information; they each represent a different dimension across which different speakers may be differentiated. Each supervector in the original training set can be represented as a linear combination of these eigenvectors. The eigenvectors are ordered by their importance in modeling the data: the first eigenvector is more important than the second, which is more important than the third, and so on. Our experiments with this technique thus far show that the first eigenvector appears to correspond to a male-female dimension.

Although a maximum of T eigenvectors is produced at step 32, in practice, it is possible to discard several of these eigenvectors, keeping only the first N eigenvectors. Thus at step 36 we optionally extract N of the T eigenvectors to comprise a reduced parameter eigenspace at 38. The higher order eigenvectors can be discarded because they typically contain less important information with which to discriminate among speakers. Reducing the eigenvoice space to fewer than the total number of training speakers provides an inherent data compression that can be helpful when constructing practical systems with limited memory and processor resources.

Performing the Adaptation

Figure 3:
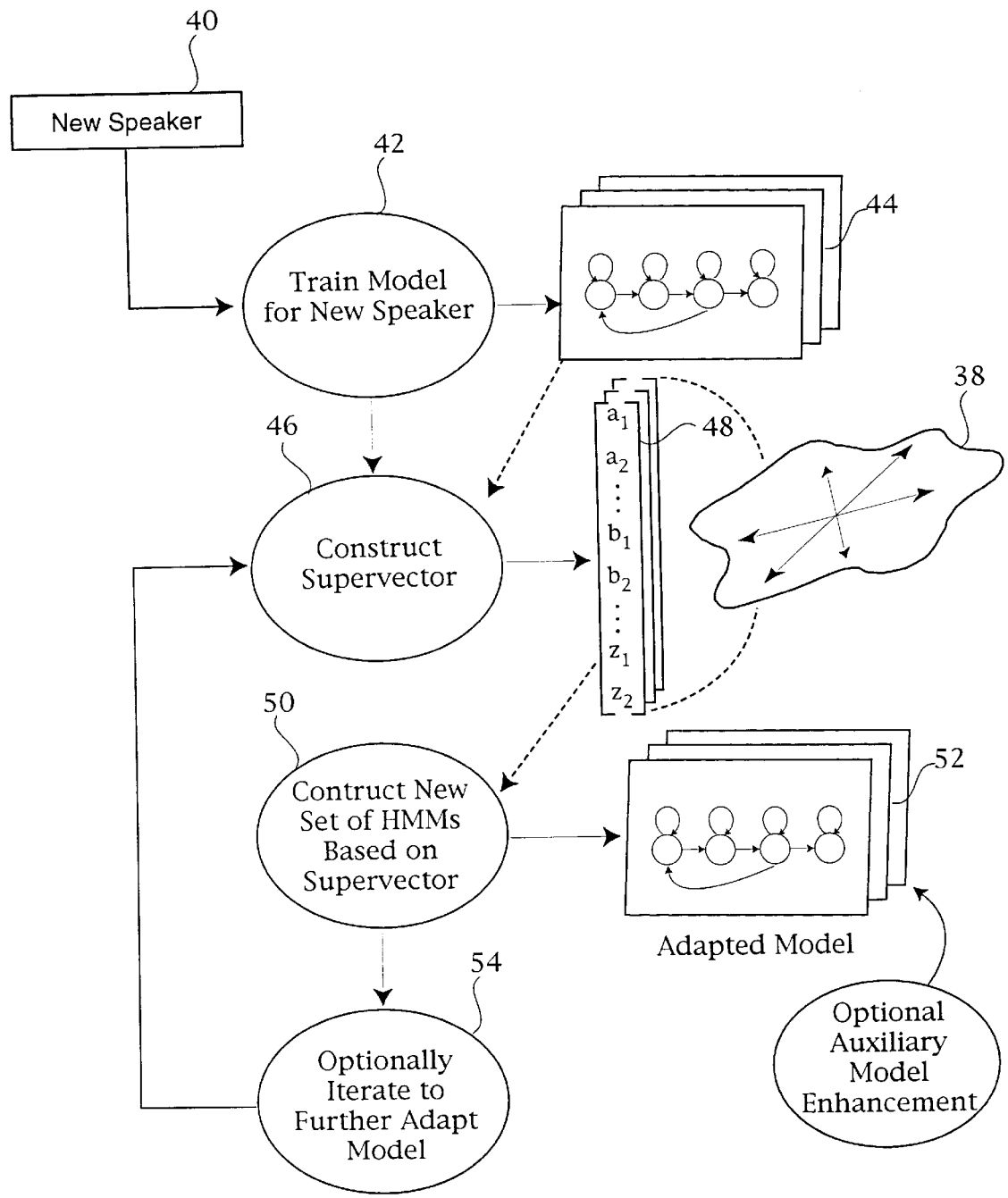
FIG. 3 is a data flow diagram illustrating how an adapted model is constructed using the eigenvoices in accordance with the invention.

Once the eigenvoice space has been constructed, speaker normalization, speaker adaptation or environment adaptation can be readily accomplished. While constructing the eigenspace is somewhat computationally intensive, and is typically conducted offline, adaptation is a comparatively simple computational operation that can be performed while the new speaker is using the system. Referring to FIG. 3, speech from new speaker 40 is used at step 42 to train a speaker dependent model to construct a set of HMMs 44 (one for each sound unit). The speaker dependent model can be trained in either a supervised mode, where the training system knows the content of the training speech in advance, or in an unsupervised mode, where the speech recognition system uses a speaker independent model to determine the content of the adaptation speech.

The speaker dependent model trained on this new speaker will usually be very inadequate for recognition, at least at first. However, the model may nevertheless be used to construct a supervector. The supervector is constructed at step 46 such that the supervector (supervector 48) is constrained to fall within the eigenvoice space 38 previously created from the training speakers. Supervector 48 is constructed with the imposed constraint that the HMM model used for recognition must be a linear combination of the eigenvoices comprising eigenvoice space 38.

The speaker dependent model 44 serves to estimate the linear combination of coefficients that will comprise the adapted model for that new speaker. Thus in step 50 a new set of HMMs is constructed based on supervector 48 to generate the adapted model 52. If desired, an optional iterative process may be performed at 54 to construct a new supervector from the adapted model 52 and thereafter to construct another set of HMMs from which a further adapted model may be constructed.

Figure 4:
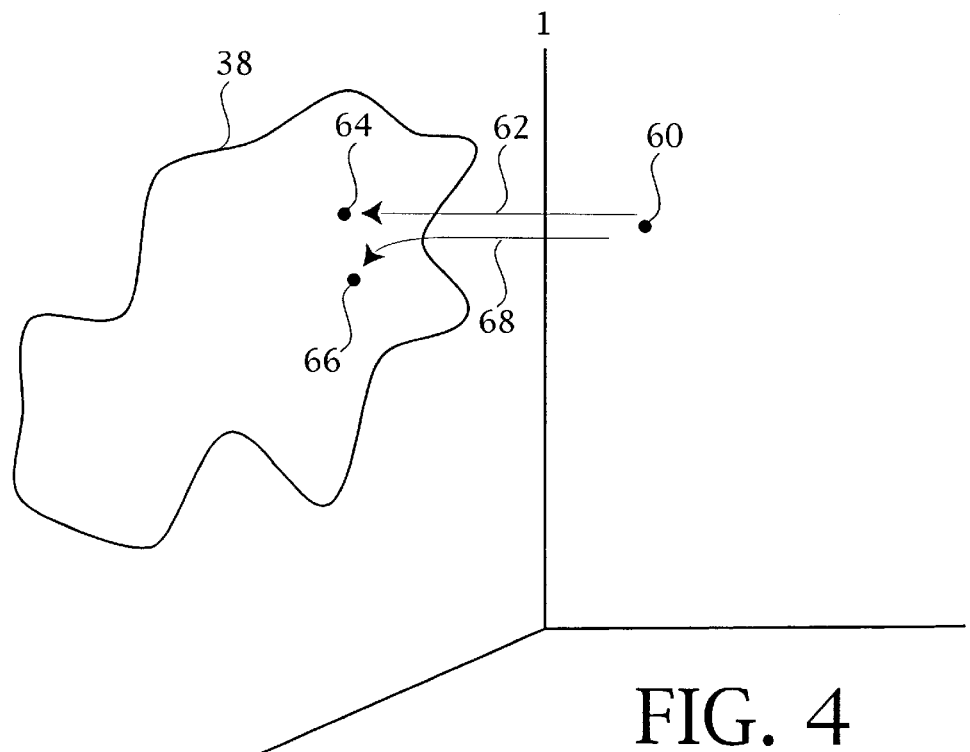
FIG. 4 is a simplified (two dimensional) illustration of eigenspace, comparing the projection operation with the MLED maximum likelihood operation of the invention.

FIG. 4 illustrates, in two dimensional space, the process by which the speech model of a new speaker is constrained within the eigenspace 38. As noted above, the eigenspace is a multi-dimensional space of order equal to the number of eigenvectors generated through dimensionality reduction.

Only two dimensions are illustrated in FIG. 4, to simplify the illustration, but it will be understood that eigenspace 38 is typically of much higher order than two.

The new speaker is shown diagrammatically by data point 60. Data point 60 would correspond to the supervector 48 shown in FIG. 3. Note that the new speaker at 60 lies outside eigenspace 38. As discussed above, the adaptation procedure involves finding a point within eigenspace that represents a good adapted model for this new speaker. The adapted model is based on the input speech uttered by the new speaker, but also constrained to be within eigenspace 38.

One simple technique for placing the new speaker within eigenspace is to use a simple projection operation illustrated by line 62. A projection operation finds the point within eigenspace that is as close as possible to the point outside of eigenspace corresponding to the new speaker's input speech. Thus the simple projection would place the new speaker at point 64 within eigenspace 38. It bears noting that these points are actually supervectors from which a set of HMMs can be reconstituted.

The projection operation is a comparatively crude technique that does not guarantee that the point within eigenspace is optimal for the new speaker. Furthermore, the projection operation requires that the supervector for the new speaker contain a complete set of data to represent the entire set of HMMs for that speaker. This requirement gives rise to a significant practical limitation. When using projection to constrain a new speaker to the eigenspace, that speaker must supply enough input speech so that all speech units are represented in the data. For example, if the Hidden Markov Models are designed to represent all phonemes in the English language, then the training speaker must supply examples of all phonemes before the simple projection technique can be used. In many applications this constraint is simply not practical.

The Maximum Likelihood Eigenvoice Decomposition (MLED) Technique

The maximum likelihood technique of the invention addresses both of the above-mentioned drawbacks of simple projection. The maximum likelihood technique of the invention finds a point 66 within eigenspace 38 that represents the supervector corresponding to a set of Hidden Markov Models that have the maximum probability of generating the speech supplied by the new speaker. For illustration purposes, the maximum likelihood process is illustrated by line 68 in FIG. 4.

Whereas the simple projection operation treats all members of the supervector as having equal importance, the maximum likelihood technique is based on probabilities arising from the actual adaptation data and thus weights the more informative data more heavily. Unlike the simple projection technique, the maximum likelihood technique will work even if the new speaker has not supplied a full set of training data (i.e., data for some of the sound units are missing). In effect, the maximum likelihood technique takes into account the context under which the supervectors are constructed, namely from Hidden Markov Models involving probabilities that certain models are more likely than others to generate the input speech supplied by the new speaker.

In practical effect, the maximum likelihood technique will select the supervector within eigenspace that is the most consistent with the new speaker's input speech, regardless of how much input speech is actually available. To illustrate, assume that the new speaker is a young female native of Alabama. Upon receipt of a few uttered syllables from this speaker, the maximum likelihood technique will select a point within eigenspace that represents all phonemes (even those not yet represented in the input speech) consistent with this speaker's native Alabama female accent.

Figure 5:
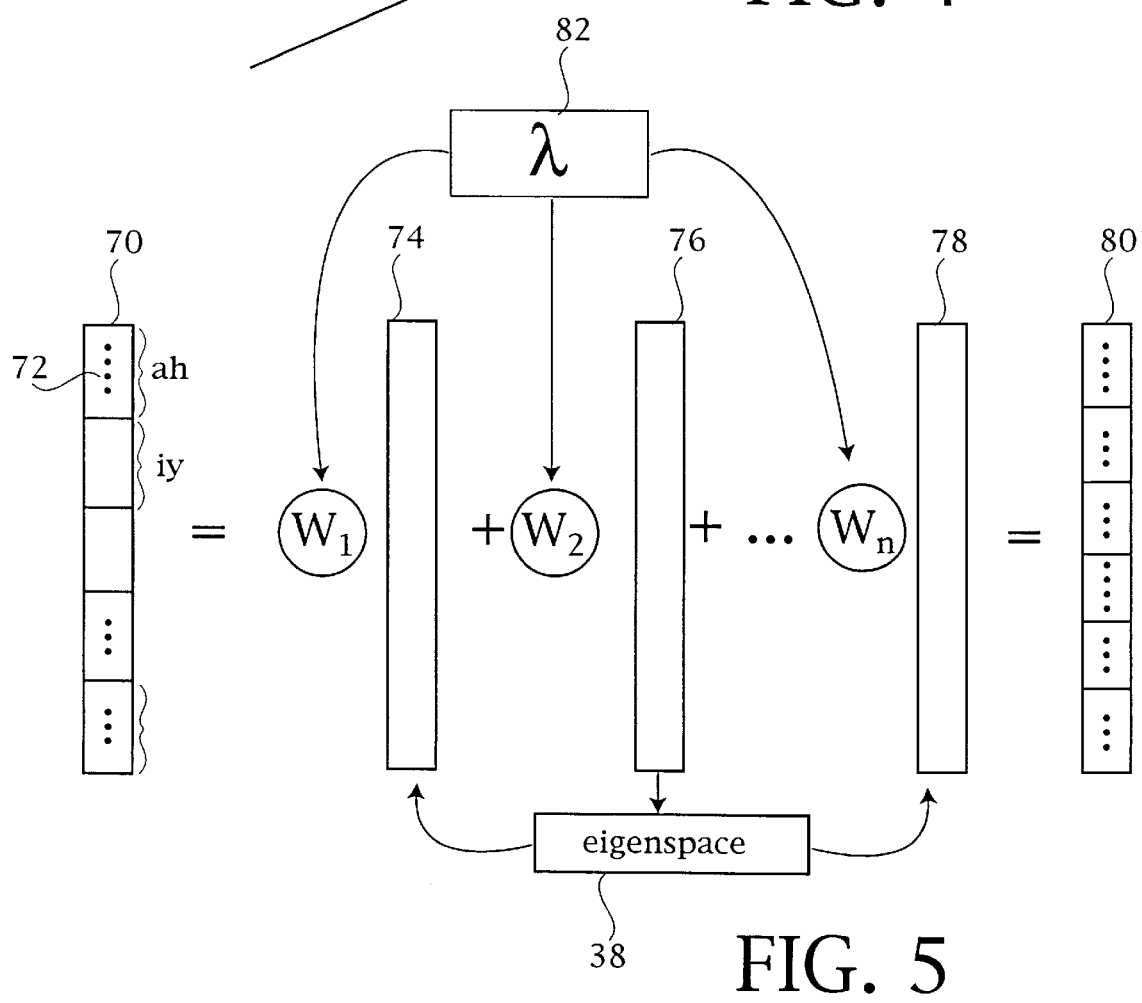
FIG. 5 is a data structure diagram illustrating how the observation data from a new speaker is transformed through eigenspace into an adapted model in accordance with the invention.

FIG. 5 shows how the maximum likelihood technique works. The input speech from the new speaker is used to construct supervector 70. As explained above, the supervector comprises a concatenated list of speech parameters, corresponding to cepstral coefficients or the like. In the illustrated embodiment these parameters are floating point numbers representing the Gaussian means extracted from the set of Hidden Markov Models corresponding to the new speaker. Other HMM parameters may also be used. In the illustration these HMM means are shown as dots, as at 72. When fully populated with data, supervector 70 would contain floating point numbers for each of the HMM means, corresponding to each of the sound units represented by the HMM models. For illustration purposes it is assumed here that the parameters for phoneme "ah" are present but parameters for phoneme "iy" are missing.

The eigenspace 38 is represented by a set of eigenvectors 74, 76 and 78. The supervector 70 corresponding to the observation data from the new speaker may be represented in eigenspace by multiplying each of the eigenvectors by a corresponding eigenvalue, designated $W_1, W_2 \ldots W_n$. These eigenvalues are initially unknown. The maximum likelihood technique finds values for these unknown eigenvalues. As will be more fully explained, these values are selected by seeking the optimal solution that will best represent the new speaker within eigenspace.

After multiplying the eigenvalues with the corresponding eigenvectors of eigenspace 38 and summing the resultant products, an adapted model 80 is produced. Whereas the supervector of the input speech (supervector 70) may have had some missing parameter values (the "iy" parameters, for example), the supervector 80 representing the adapted model is fully populated with values. That is one benefit of the invention. Moreover, the values in supervector 80 represent the optimal solution, namely that which has the maximum likelihood of representing the new speaker in eigenspace.

The individual eigenvalues $W_1, W_2 \ldots W_n$ may be viewed as comprising a maximum likelihood vector, herein referred to as maximum likelihood vector . FIG. 5 illustrates vector diagrammatically at 82. As the illustration shows, maximum likelihood vector 82 comprises the set of eigenvalues $W_1, W_2 \ldots W_n$.

Figure 6:
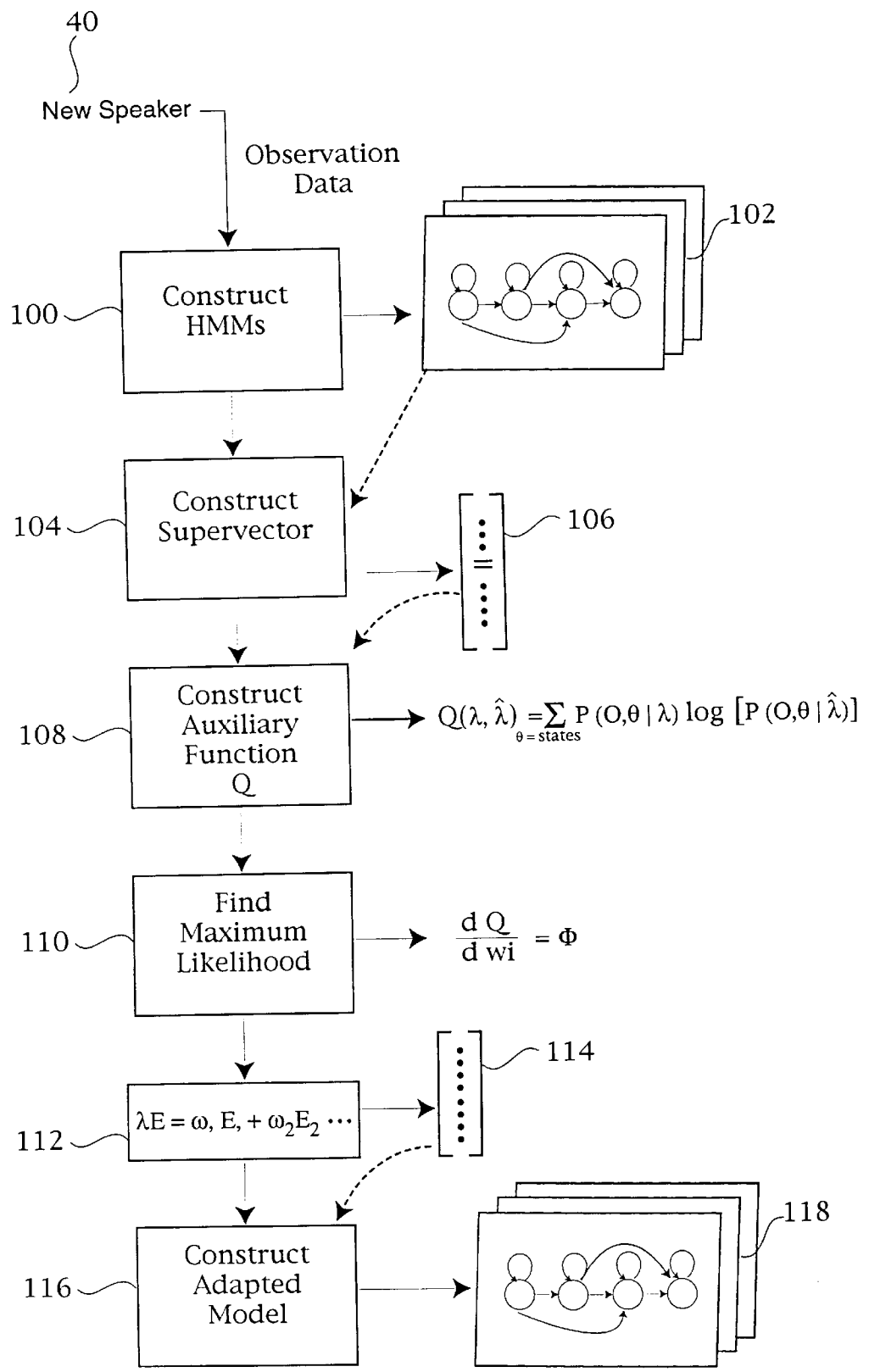
FIG. 6 is a flowchart diagram illustrating the maximum likelihood eigenspace adaptation process of the invention.

The procedure for performing adaptation using the maximum likelihood technique is shown in FIG. 6. Speech from a new speaker, comprising the observation data, is used to construct a set of HMMs as depicted at 100. The set of HMMs 102 is then used in constructing a supervector as depicted at 104. As illustrated, the supervector 106 comprises a concatenated list of HMM parameters extracted from the HMM models 102.

Using the supervector 106, a probability function Q is constructed at 108. The presently preferred embodiment employs a probability function that represents the probability of generating the observed data for the pre-defined set of HMM models 102. Subsequent manipulation of the probability function Q is made easier if the function includes not only a probability term P but also the logarithm of that term, log P.

The probability function is then maximized at step 110 by taking the derivative of the probability function individually with respect to each of the eigenvalues $W_1, W_2 \ldots W_n$. For example, if the eigenspace is of dimension 100, this system calculates 100 derivatives of the probability function Q setting each to zero and solving for the respective W. While this may seem like a large computation, it is far less computationally expensive than performing the thousands of computations typically required of conventional MAP or MLLR techniques.

The resulting set of Ws, so obtained, represent the eigenvalues needed to identify the point in eigenspace corresponding to the point of maximum likelihood. Thus the set of Ws comprises a maximum likelihood vector in eigenspace. In this regard, each of the eigenvectors (eigenvectors 74, 76 and 78 in FIG. 5) define a set of orthogonal vectors or coordinates against which the eigenvalues are multiplied to define a point constrained within eigenspace. This maximum likelihood vector, depicted at 112, is used to construct supervector 114 corresponding to the optimal point in eigenspace (point 66 in FIG. 4). Supervector 114 may then be used at step 116 to construct the adapted model 118 for the new speaker.

In the context of the maximum likelihood framework of the invention, we wish to maximize the likelihood of an observation O=o1 . . . oT with regard to the model λ. This may be done by iteratively maximizing the auxiliary function Q (below), where λ is the current model at the iteration and $\hat{\lambda}$ is the estimated model. We have:

$$Q(\lambda, \hat{\lambda}) = \sum_{\theta \in \text{states}} P(O, \theta | \lambda) \log[P(O, \theta | \hat{\lambda})]$$

As a preliminary approximation, we might want to carry out a maximization with regards to the means only. In the context where the probability P is given by a set of HMMs, we obtain the following:

$$Q(\lambda, \hat{\lambda}) =$$

$$const - \frac{1}{2} P(O | \lambda) \sum_{\substack{\text{states} \\ \text{in } \lambda}}^{S_\lambda} \sum_{\substack{\text{mixt} \\ \text{gauss} \\ \text{in } S}}^{M_s} \sum_{t}^{T} \{\gamma_m^{(s)}(t)[n\log(2\pi) + \log | C_m^{(s)} | \ h(o_t, m, s)]\}$$

where:

$$h(o_t, m, s) = (o_t - \hat{\mu}_m^{(s)})^T C_m^{(s)-1} (o_t - \hat{\mu}_m^{(s)})$$

and let:

$o_t$ be the feature vector at time t $C_m^{(s)-1}$ be the inverse covariance for mixture Gaussian m of state s $\hat{\mu}_m^{(s)}$ be the approximated adapted mean for state s, mixture component m $\gamma_m^{(s)}(t)$ be the P(using mix Gaussian m|γ, $o_t$)

Suppose the Gaussian means for the HMMs of the new speaker are located in eigenspace. Let this space be spanned by the mean supervectors $\bar{\mu}_j$ with j=1 . . . E, $$\bar{\mu}_j = \begin{bmatrix} \bar{\mu}_1^{(1)}(j) \\ \bar{\mu}_2^{(1)}(j) \\ \vdots \\ \bar{\mu}_m^{(s)}(j) \\ \bar{\mu}_{M_{S_\lambda}}^{(S_\lambda)}(j) \end{bmatrix}$$

where $\bar{\mu}_m^{(s)}(j)$ represents the mean vector for the mixture Gaussian m in the state s of the eigenvector (eigenmodel) j. Then we need:

$$\hat{\mu} = \sum_{j=1}^{E} w_j \bar{\mu}_j$$

The $\bar{\mu}_j$ are orthogonal and the $w_j$ are the eigenvalues of our speaker model. We assume here that any new speaker can be modeled as a linear combination of our database of observed speakers. Then $$\hat{\mu}_m^{(s)} = \sum_{j=1}^{E} w_j \bar{\mu}_m^{(s)}(j)$$

with s in states of λ, m in mixture Gaussians of M.

Since we need to maximize Q, we just need to set $$\frac{\partial Q}{\partial w_e} = 0, \quad e = 1...E.$$

(Note that because the eigenvectors are orthogonal, $$\frac{\partial w_i}{\partial w_j} = 0, i \neq j..)$$

Hence we have $$\frac{\partial Q}{\partial w_e} = 0 = \sum_{\substack{\text{states} \\ \text{in } \lambda}}^{S_\lambda} \sum_{\substack{\text{mixt} \\ \text{gauss} \\ \text{in } S}}^{M_S} \sum_{\text{time}}^{T} \left\{ \frac{\partial}{\partial w_e} \gamma_m^{(s)}(t) h(o_t, s) \right\}, e = 1...E.$$

Computing the above derivative, we have:

$$0 = \sum_s \sum_m \sum_t \gamma_m^{(s)}(t) \left\{ -\bar{\mu}_m^{(s)T}(e) C_m^{(s)-1} o_t + \sum_{j=1}^{E} w_j \bar{\mu}_m^{(s)T}(j) C_m^{(s)-1} \bar{\mu}_m^{(s)}(e) \right\}$$

from which we find the set of linear equations $$\sum_s \sum_m \sum_t \gamma_m^{(s)}(t) \bar{\mu}_m^{(s)T}(e) C_m^{(s)-1} o_t =$$

$$\sum_s \sum_m \sum_t \gamma_m^{(s)}(t) \sum_{j=1}^{E} w_j \bar{\mu}_m^{(s)T}(j) C_m^{(s)-1} \bar{\mu}_m^{(s)}(e), e = 1...E.$$

Auxiliary Adaptation After Finding Speaker Model in Eigenspace

The eigenvoice adaptation technique described above develops an initial adapted model for the new speaker. If desired, this model may then be further improved using auxiliary adaptation techniques to further refine the adapted model. Suitable auxiliary adaptation techniques include Maximum A Posteriori estimation (MAP) and transformation-based approaches, such as Maximum Likelihood Linear Regression (MLLR). In experiments to date we have found that often the best results are obtained by applying the MLED technique first and then one of these auxiliary adaptation techniques, as illustrated.

The eigenvoice techniques try to estimate the position of a new speaker in eigenvoice space. However, unless the new speaker was also a training speaker, it is unlikely that he or she is located exactly in this subspace. The eigenvoice technique works well if the new speaker is close to the estimated position in eigenvoice space, but that may not always be the case. Thus, in general, the eigenvoice technique, used alone, is unlikely to provide the "true" model for the new speaker. The eigenvoice technique cannot represent phenomena peculiar to the new speaker (i.e., not seen among the training speakers). The advantage of the eigenvoice techniques is that they quickly provide a reasonable approximate model for the new speaker.

On the other hand, MAP and other transformation-based approaches such as MLLR are quite capable of finding the "true" model for the new speaker; but they get to it slowly if they start from a speaker-independent model (the usual approach). MLED or some other eigenvoice technique, followed by auxiliary processing such as MAP or other transformation-based approaches such as MLLR, offers the best of both worlds: fast estimation of a reasonably good model for the new speaker followed by convergence to the "true" model.

Applying Dimensionality Reduction to Transformation Matrices

Transformation-based auxiliary adaptation techniques, such as MLLR, can also provide the raw material for dimensionality reduction. In such case the eigenvoice adaptation is performed upon dimensionally-reduced transform matrices as opposed to dimensionally-reduced model parameters.

In the examples presented so far speaker models were used to construct supervectors, and these supervectors were then dimensionally reduced to generate the eigenspace. In an alternate technique according to one aspect of the invention, the training speaker data are run through a transformation process and the resulting transformation matrices are then used to generate the eigenspace.

Figure 7:
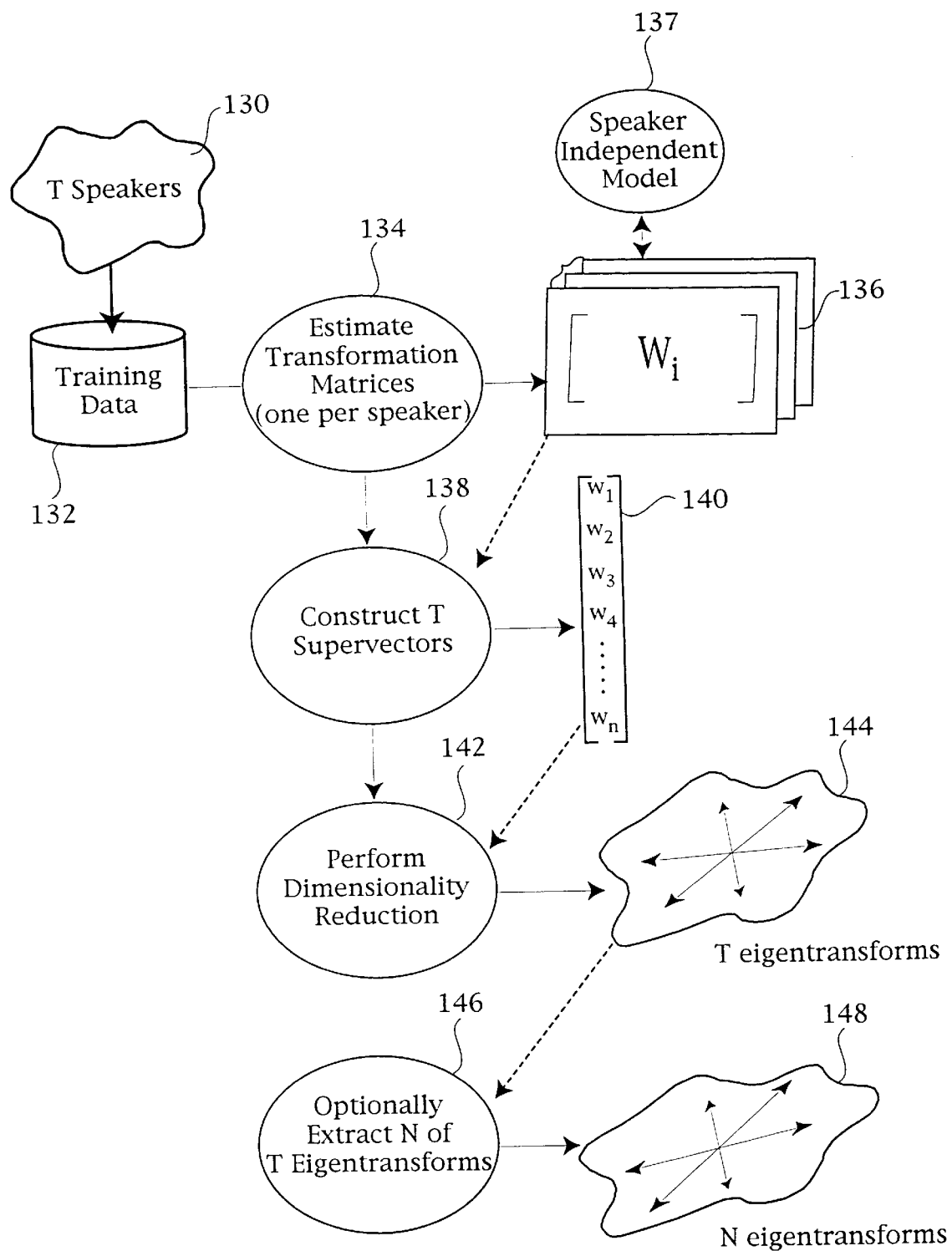
FIG. 7 is a data flow diagram illustrating the dimensionality reduction process for defining an eigenspace based on transformation matrices.

To illustrate, refer to FIG. 7 in which T speakers at 130 supply training data 132 and these training data are then operated upon by a transformation-based adaptation technique, such as MLLR, to estimate transformation matrices, one per speaker, as at 134. This generates a set of transformation matrices $W_1$, one per speaker, as illustrated at 136. The set of transformation matrices would be applied to the speaker model 137 in representing each speaker.

The set of transformation matrices is then used at step 138 to construct T supervectors 140. The supervectors may be constructed by concatenating the transformation matrix parameters similar to the manner in which speaker model parameters were concatenated in previous examples.

Dimensionality reduction is then performed at step 142, yielding an eigenspace 144 of T "eigentransform" vectors. If desired, the process may optionally extract a subset N of the T eigentransforms as indicated at 146. This results in an eigenspace 148 of N eigentransforms.

To adapt to a new speaker quickly, the system assumes that the appropriate transforms $W_i$ for that new speaker are located in the subspace spanned by the eigentransforms. The system estimates the appropriate linear combination of eigentransforms, using a simple projection or other technique such as the MLED technique described above. This results in an eigentransform vector for the new speaker than can readily be applied to the speaker independent model in order to arrive at the adapted model for the new speaker.

Using Bayesian Estimation Within Eigenspace

Data from the training speakers, processed by dimensionality reduction, defines the metes and bounds of eigenspace. Typically the training speakers, themselves, are not evenly distributed across eigenspace. Rather, there is a probability distribution, with some regions within eigenspace being thinly populated and other regions being densely populated. Inasmuch as this probability distribution comes from the training speakers and is thus known after training, Bayesian estimation can be used advantageously within eigenspace.

Bayesian estimation takes into account both the prior probability distribution (of the original training speakers) and the observed data from the new speaker. Formally, assume a prior probability distribution $g(\lambda)$ for speaker models $\lambda$. Given observations O for a new speaker, Bayesian estimation endeavors to find the $\lambda$ that maximizes the following relationship:

$$L(O|\lambda)*g(\lambda)$$

That is, we use our prior knowledge (presumably from training speakers) about what areas of speaker space are densely or thinly populated to refine our estimates lambda "hat":

$$\hat{\lambda}$$

of the location of the new speaker in that space. Thus Bayesian estimation involves a blend of prior probability distribution with newly observed data where a maximum probability is sought for the new estimate.

There are a number of different ways of carrying out Bayesian estimation in eigenvoice space. The following will present some of these ways but this discussion is not intended to be exhaustive.

One technique uses the MLED technique discussed above to estimate the new speaker in eigenvoice space, where w is the vector of weights on the eigenvoices defined in the following equation:

$$w=[L(O|\hat{\lambda})*A+\tau I]^{-1}*[\tau v+L(O|\hat{\lambda})*b]$$

In the above equation Aw=b is the equation solved to obtain the MLED estimate. Lambda hat is an initial estimate for the new speaker model (e.g., the speaker independent model), v is a vector obtained from the first derivatives of the log prior, and $\tau$ is a time factor. The time factor, $\tau$ models the variability of a speaker over time—the more time-varying a particular eigendimension is, the more weight will be put on the prior in that dimension.

Another way of incorporating priors and carrying out Bayesian estimation in eigenvoice space is to estimate Gaussian densities for the high dimensional data, using the projections of such data into low dimensional eigenspace. If x is an observation vector drawn from the class omega and E is an eigenspace obtained by choosing the first K eigenvectors derived from dimensionality reduction on the training data from omega, then the following equation holds:

$$\hat{P}(\chi|\Omega)=P_E(\chi|\Omega)*P_{\bar{E}}(\chi|\Omega)$$

In the above equation the single-Gaussian density in eigenspace E is represented by the term:

$$P_E(\chi|\Omega)$$

The single-Gaussian distribution in the dual space, that is, in the space orthogonal to eigenvoice space is represented by the term:

$$P_{\bar{E}}(\chi|\Omega)$$

Both terms can be estimated entirely from the set of training data vectors, using only the projections into E and the residuals.

A simple, approximate way of taking priors into account is to assume that each eigendimension is roughly independent. Each dimension could then be divided into a small number of clusters, with each cluster having a single-Gaussian output distribution and a prior probability (calculated from training speakers). Adaptation then involves choosing the most likely distribution in each dimension, based on observation from the new speaker. This approach is attractive in cases where there is high confidence in the training data and much less confidence in the data from the new speaker.

Alternatively, the training speakers can be clustered into a finite number of output distributions in eigenvoice space, each with a prior probability. Adaptation then consists of finding the cluster that best matches the new observations. This technique places more weight on the priors than on the new observation data.

Figure 8:
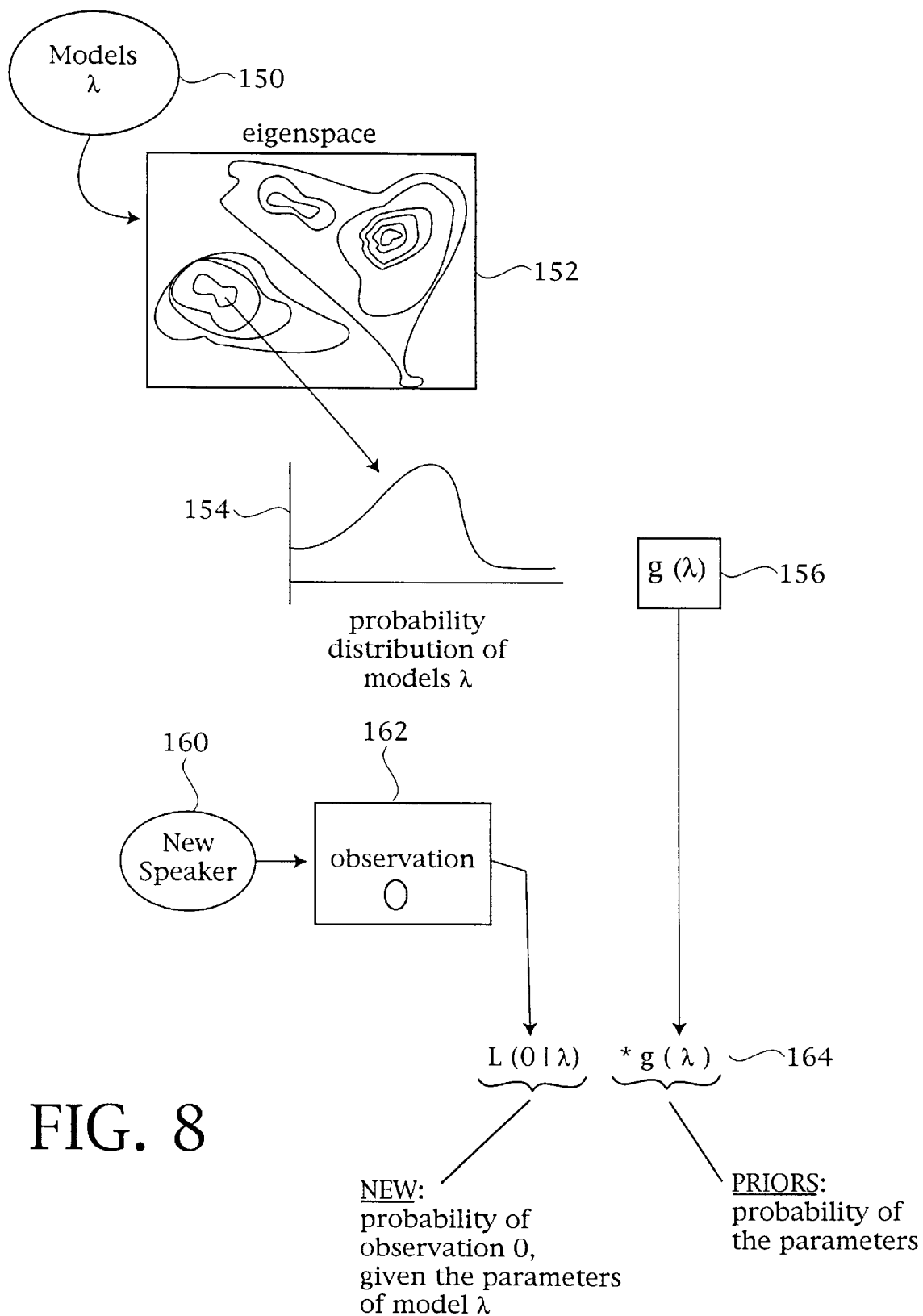
FIG. 8 is a pictorial block diagram useful in understanding the Bayesian estimation techniques.

FIG. 8 summarizes the basic Bayesian estimation technique as applied to eigenvoice space. Referring to FIG. 8, the training data generates models lambda illustrated at 150. These models correspond to an eigenspace 152. The models are not evenly distributed across the eigenspace, rather there are regions of dense population and regions of sparse population. This has been illustrated diagrammatically in the form of a "topographical" map. These models lambda have a probability distribution illustrated diagrammatically at 154 and also depicted at 156 by the probability function g(lambda).

The new speaker 160 provides observation data O, shown diagrammatically at 162. Probability distribution 156 and observation O are multiplied in Bayesian equation 164 and this product is used to seek the model lambda for the new speaker that maximized the Bayesian equation 164. Note that equation 164 comprises a first term that depends on the probability of encountering observation O, given the parameters of model lambda; and a second term that depends on the probability distribution of the original training data. Thus the first term represents the new speaker and the second term represents the priors.

Environment Adaptation

While the invention has been described thus far as a speaker adaptation technique, the techniques can be readily extended to environment adaptation. Many speech recognition systems are quite sensitive to environmental conditions, such as microphone placement, room acoustics, background noise, and audio signal channel quality, for example. The eigenvectors can be used to model different speaking environments, just as they are used to model different speakers.

In most instances it is desirable to accommodate the needs of both speaker adaptation and environment adaptation. To do this we simply need to insure that the training speakers are recorded in a wide variety of environments. To obtain good performance, the number of training speakers and number of eigenvoices retained may need to be larger than is necessary for eigenvoice adaptation in a quiet environment. Otherwise, the procedure is the same as described above.

To construct a speaker independent system that adapts to the environment, but not to the speaker, a slight modification to the above technique is used. First, train E speaker independent models, where E is the number of different environments in the training data. Each of the E models is trained on many different speakers in the same environment. Ideally, the E different recording environments will be as diverse as possible. Then, the eigenvoice procedure is carried out as described above. In this case, the eigenvoice vectors will represent the components of variation between environments. Thus the first eigenvector may or may not represent the male-female dimension as it did in the speaker adaptation example.

Summary of Eigenvoice Techniques Presented

Figure 9:
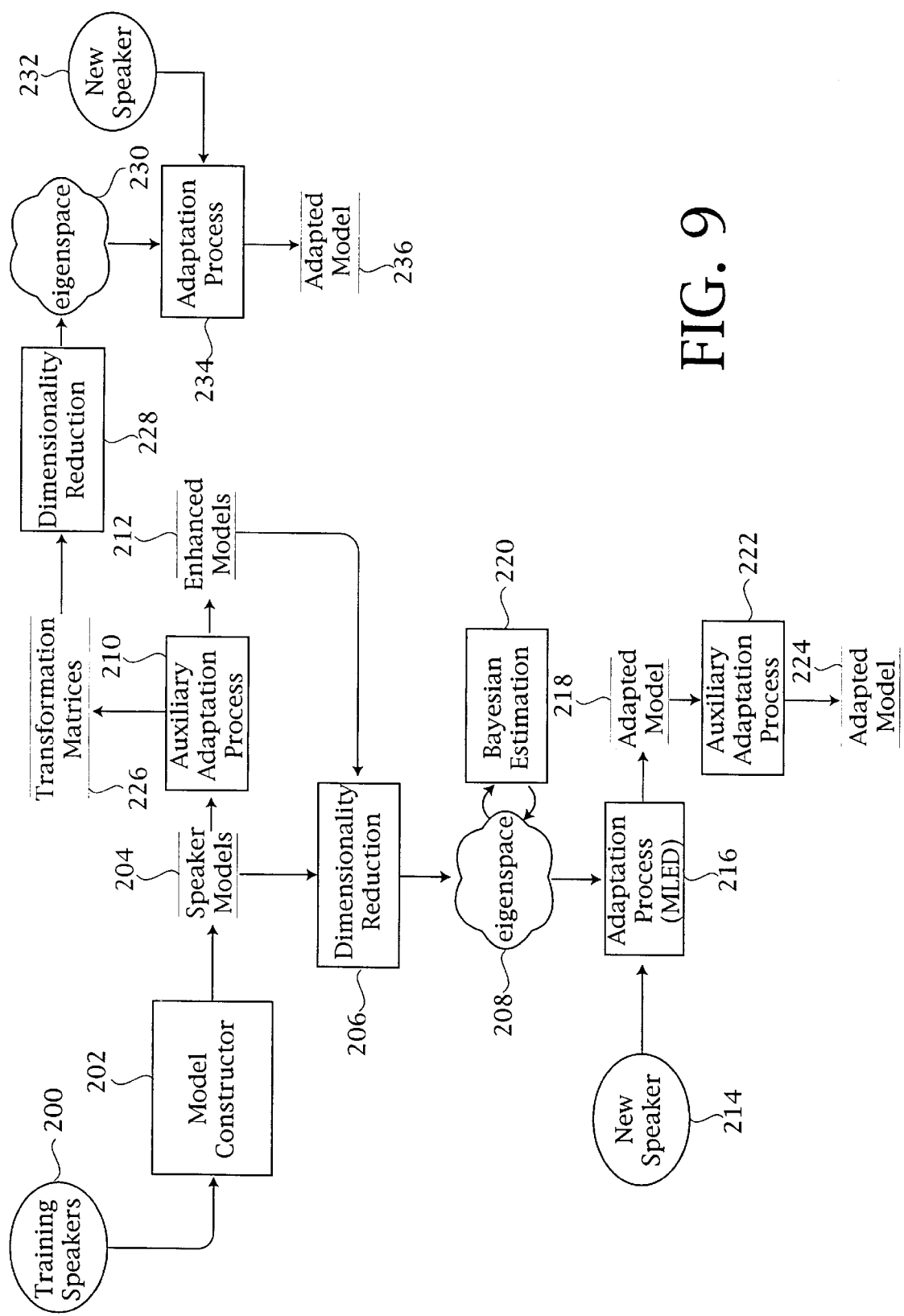
FIG. 9 is a data flow diagram summarizing the various eigenvoice adaptation techniques described in the specification.

The eigenvoice adaptation techniques of the invention can be deployed in a variety of different contexts. They may be used singly or in combination with other adaptation techniques as outlined above. FIG. 9 summarizes some of the possible uses and implementations of the eigenvoice adaptation techniques. Referring to FIG. 9, training speakers 200 provide input to the model constructor 202 used to generate the initial set of speaker models 204. At this point several different approaches can be taken.

As illustrated at 206, dimensionality reduction can be performed upon the speaker models 204 to generate the eigenspace 208.

Alternatively, speaker models 204 can be refined using an auxiliary adaptation process 210 to produce a set of refined or enhanced models 212. As indicated above, the auxiliary adaptation process can implement MAP estimation or other transformation-based approach, such as MLLR. Dimensionality reduction 206 may then be applied to these enhanced models, yielding an eigenspace 208 based on the enhanced models of the training speakers 200.

Adaptation of a new speaker, such as new speaker 214 is performed by the adaptation process 216 which places the new speaker into eigenspace 208 by any of the techniques described above. The presently preferred embodiment uses the maximum likelihood technique MLED for new speaker placement into eigenspace.

As discussed above, each vector within eigenspace corresponds to a speaker model. Thus placing the new speaker 214 into eigenspace results in a vector in eigenspace that represents an adapted model for that new speaker. In FIG. 9 this adapted model is indicated at 218.

If desired, the placement of new speaker 214 into eigenspace can be enhanced by Bayesian estimation, as indicated at 220. Bayesian estimation uses prior knowledge from the training speakers 200 about which areas of speaker space are densely or thinly populated, and this knowledge is used to refine the estimate of where to place a new speaker within that space.

After the adapted model 218 has been generated, an auxiliary adaptation process 222 may be performed upon it to produce a more refined adapted model illustrated at 224. The auxiliary adaptation process 222 can employ MAP estimation or some transformation-based approach, such as MLLR. Using the auxiliary adaptation process 222 in conjunction with adaptation process 216 affords dual advantages: adaptation process 216 arrives quickly at an estimate of the adapted model for the new speaker; adaptation process 222 refines that estimate to find the best adapted model.

So far in this summary discussion the dimensionality reduction step has been performed on the speaker models 204. Recall that the dimensionality reduction process involves forming a concatenated supervector for each of the training speakers, using suitable model parameters such as the Hidden Markov Model parameters. Dimensionality reduction is not limited to speaker models, however. Dimensionality reduction can also be applied to transformation matrices generated using other speaker adaptation techniques, such as the auxiliary adaptation processes illustrated at 210.

Accordingly, FIG. 9 also illustrates this alternate use of the dimensionality reduction technique. The auxiliary adaptation process 210 generates transformation matrices as a by-product of its operation. These transformation matrices are illustrated in FIG. 9 at 226. For example, the auxiliary adaptation process 210 may be a transformation-based operation such as MLLR, which generates a set of transformation matrices $W_i$ from a speaker-independent (SI) model. This set of matrices for each training speaker is then vectorized, as by concatenation, to yield a high-dimensional supervector. Dimensionality reduction is then performed at 228 to yield an eigenspace 230 corresponding to a set of "eigentransform" vectors.

To adapt to a new speaker, such as speaker 232, the adaptation process 234 assumes that the appropriate transforms $W_i$ for that new speaker are located in the subspace spanned by the eigentransforms (eigenspace 230). Having estimated the appropriate linear combination of eigentransforms, using the MLED method, for example, the system then applies the resulting transforms $W_i$ to the speaker independent model to yield the adapted model 236 for the new speaker.

In reviewing FIG. 9, keep in mind that FIG. 9 is intended to summarize a number of the different eigenvoice adaptation techniques described elsewhere in this document. Thus the illustration in FIG. 9 is intended merely to show use of these techniques in context. A given implementation in accordance with the invention may use some, but not necessarily all, of the processes illustrated here. Moreover, FIG. 9 is not intended to be exhaustive. Numerous other combinations are also envisioned within the scope of the invention as set forth in the appended claims.

While the invention has been described in its presently preferred embodiment, it will be appreciated that the invention can be adapted to a variety of different uses. Accordingly, the preceding examples are intended to teach the concepts of the invention without limitation upon the scope of the appended claims.

What is claimed is:

1. A method for performing speaker adaptation or normalization comprising the steps of:

constructing an eigenspace to represent a plurality of training speakers by providing a set of models for said training speakers and performing dimensionality reduction upon said set of models to generate a set of basis vectors that define said eigenspace;

generating an adapted model, using input speech from a new speaker to train said adapted model, while using said set of basis vectors to constrain said adapted model such that said adapted model lies within said eigenspace.

2. The method of claim 1 wherein said dimensionality reduction is performed by concatenating a plurality of model parameters extracted from said set of models and by performing a linear transformation upon said model parameters.

3. The method of claim 1 wherein said dimensionality reduction is performed by a transformation process selected from the group consisting of: principal component analysis, linear discriminant analysis, factor analysis, independent component analysis and singular value decomposition.

4. The method of claim 1 wherein said models for said training speakers define a plurality of model parameters and said step of constructing an eigenspace comprises concatenating said model parameters for said plurality of training speakers to construct a set of supervectors and performing a linear dimensionality reduction transformation upon said supervectors to thereby generate said basis vectors.

5. The method of claim 4 wherein said models for each of said training speakers correspond to a set of different speech units and wherein each supervector is defined as a concatenation of model parameters corresponding to said speech units sorted in a predetermined order.

6. The method of claim 4 wherein said model parameters are cepstral coefficients.

7. The method of claim 1 wherein said step of performing dimensionality reduction generates a set of basis vectors equal in number to the number of training speakers.

8. The method of claim 1 wherein said step of performing dimensionality reduction generates an ordered list of basis vectors and wherein said step of constructing an eigenspace includes discarding a predetermined portion of said ordered list to reduce the order of said eigenspace.

9. The method of claim 1 wherein said step of constraining said speaker dependent model is performed by projecting said input speech into said eigenspace.

10. A method for performing speaker adaptation or normalization comprising the steps of:

constructing an eigenspace to represent a plurality of training speakers by providing a set of models for said training speakers and performing dimensionality reduction upon said set of models to generate a set of basis vectors that define said eigenspace;

generating an adapted model, using input speech from a new speaker to find a maximum likelihood vector in eigenspace defining said adapted model such that said adapted model lies within said eigenspace.

11. The method of claim 10 wherein said step of generating a maximum likelihood vector comprises:

defining a probability function representing the probability of generating an observed datum for a predefined set of models, in which said input speech supplies said observed datum; and maximizing said probability function to find said maximum likelihood vector.

12. The method of claim 10 wherein said adapted model is derived from the maximum likelihood vector by multiplying maximum likelihood vector coefficients by said basis vectors.

13. The method of claim 12 wherein said maximizing step is performed by:

representing said maximum likelihood vector as a set of eigenvalue variables;

taking a first derivative of said probability function with respect to said eigenvalue variables; and solving for the corresponding values of said eigenvalue variables when said first derivative is equated to zero.

14. A method for performing speaker adaptation or normalization comprising the steps of:

representing a plurality of training speakers as a set of speaker models, said models defining a plurality of parameters;

enhancing said speaker models by adjusting at least some of said parameters of said models to define a set of enhanced speaker models;

constructing an eigenspace to represent said plurality of training speakers by performing dimensionality reduction upon said set of enhanced models to generate a set of basis vectors that define said eigenspace;

generating an adapted model, using input speech from a new speaker to train said adapted model, while using said set of basis vectors to constrain said adapted model such that said adapted model lies within said eigenspace.

15. The method of claim 14 wherein said enhancing step is performed using maximum a posteriori estimation.

16. The method of claim 14 wherein said enhancing step is performed using a transformation-based estimation process.

17. The method of claim 14 wherein said enhancing step is performed using maximum likelihood linear regression estimation.

18. The method of claim 14 wherein said step of generating said adapted model comprises using input speech from said new speaker to generate a maximum likelihood vector and to train said adapted model, while using said set of basis vectors and said maximum likelihood vector to constrain said adapted model such that said adapted model lies within said eigenspace.

19. A method for performing speaker adaptation or normalization comprising the steps of:

constructing an eigenspace to represent a plurality of training speakers by providing a set of models for said training speakers and performing dimensionality reduction upon said set of models to generate a set of basis vectors that define said eigenspace;

generating an adapted model, using input speech from a new speaker to train said adapted model, while using said set of basis vectors to constrain said adapted model such that said adapted model lies within said eigenspace; and enhancing said adapted model by extracting model parameters from said adapted model and adjusting at least some of said parameters based on said input speech from said new speaker.

20. The method of claim 19 wherein said enhancing step is performed using maximum a posteriori estimation.

21. The method of claim 19 wherein said enhancing step is performed using a transformation-based estimation process.

22. The method of claim 19 wherein said enhancing step is performed using maximum likelihood linear regression estimation.

23. The method of claim 19 wherein said step of generating said adapted model comprises using input speech from said new speaker to generate a maximum likelihood vector and to train said adapted model, while using said set of basis vectors and said maximum likelihood vector to constrain said adapted model such that said adapted model lies within said eigenspace.

24. The method of claim 23 wherein said enhancing step is performed using maximum a posteriori estimation.

25. The method of claim 23 wherein said enhancing step is performed using a transformation-based estimation process.

26. The method of claim 23 wherein said enhancing step is performed using maximum likelihood linear regression estimation.

27. A method for performing speaker adaptation or normalization comprising the steps of:

representing a plurality of training speakers as first sets of transformation matrices together with a model to which the transformation matrices are applied;

constructing an eigenspace to represent said plurality of training speakers by performing dimensionality reduction upon said first sets of transformation matrices to generate a set of basis vectors that define said eigenspace;

generating a second set of transformation matrices using input speech from a new speaker while using said set of basis vectors to constrain said second set of transformation matrices such that said second set lies within said eigenspace.

28. The method of claim 27 wherein said first sets of transformation matrices are generated by maximum likelihood linear regression.

29. The method of claim 27 further comprising vectorizing each of said first sets of transformation matrices to define a set of supervectors and performing dimensionality reduction upon said supervectors to define said eigenspace.

30. The method of claim 27 further comprising generating said second set of transformation matrices using input speech from a new speaker to generate a maximum likelihood vector using said maximum likelihood vector to determine a location within said eigenspace.

31. A method for performing speaker adaptation or normalization comprising the steps of:

constructing an eigenspace to represent a plurality of training speakers by providing a set of first models for said training speakers and performing dimensionality reduction upon said set of first models to generate a set of basis vectors that define said eigenspace;

generating an adapted model using input speech from a new speaker to train said adapted model, while using said set of basis vectors to constrain said adapted model such that said adapted model lies within said eigenspace, wherein said first models define a first probability distribution and said input speech defines observation data and wherein said adapted model is generated such that the product of said observation data and said first probability distribution is maximized.

32. The method of claim 31 further comprising applying a confidence factor to said first probability distribution and said second probability distribution to reflect how confidence in information provided by said distributions varies over time.

* * * * *

UNITED STATES PATENT AND TRADEMARK OFFICE
CERTIFICATE OF CORRECTION

PATENT NO. : 6,343,267 B1
APPLICATION NO. : 09/148753
DATED : January 29, 2002
INVENTOR(S) : Roland Kuhn et al.

It is certified that error appears in the above-identified patent and that said Letters Patent is hereby corrected as shown below:

What is claimed is:

1. A method for performing speaker adaptation or normalization comprising the steps of:

constructing an eigenspace to represent a plurality of training speakers as a population by providing a set of models for said training speakers, representing said set of models as first vectors of a first predetermined dimension and performing dimensionality reduction upon said first vectors to generate a set of basis vectors of a second dimension substantially smaller than said first predetermined dimension that define said eigenspace;
    generating an adapted model, using input speech from a new speaker to train said adapted model, while using said set of basis vectors to constrain said adapted model such that said adapted model lies within said eigenspace.

10. A method for performing speaker adaptation or normalization comprising the steps of:

constructing an eigenspace to represent a plurality of training speakers as a population by providing a set of models for said training speakers, representing said set of models as first vectors of a first predetermined dimension and performing dimensionality reduction upon said first vectors to generate a set of basis vectors of a second dimension substantially smaller than said first predetermined dimension that define said eigenspace;
    generating an adapted model, using input speech from a new speaker to find a maximum likelihood vector in eigenspace defining said adapted model such that said adapted model lies within said eigenspace.

14. A method for performing speaker adaptation or normalization comprising the steps of:

representing a plurality of training speakers as a set of speaker models, said models defining a plurality of parameters;
    enhancing said speaker models by adjusting at least some of said parameters of said models to define a set of enhanced speaker models;
    constructing an elgenspace to represent said plurality of training speakers as a population by providing a set of models for said training speakers, representing said set of models as first vectors of a first predetermined dimension by performing dimensionality reduction upon said set of enhanced models to generate a set of basis vectors of a second dimension substantially smaller than said first predetermined dimension that define said eigenspace;

UNITED STATES PATENT AND TRADEMARK OFFICE
CERTIFICATE OF CORRECTION

| | |
|---|---|
| PATENT NO. | : 6,343,267 B1 |
| APPLICATION NO. | : 09/148753 |
| DATED | : January 29, 2002 |
| INVENTOR(S) | : Roland Kuhn et al. |

It is certified that error appears in the above-identified patent and that said Letters Patent is hereby corrected as shown below:

Claim 14 (cont'd):

generating an adapted model, using input speech from a new speaker to train said adapted model, while using said set of basis vectors to constrain said adapted model such that said adapted model lies within said eigenspace.

19. A method for performing speaker adaptation or normalization comprising the steps of:

constructing an eigenspace to represent a plurality of training speakers as a population by providing a set of models for said training speakers, representing said set of models as vectors of a first predetermined dimension and performing dimensionality reduction upon said first vectors to generate a set of basis vectors of a second dimension substantially smaller than said first predetermined dimension that define said eigenspace;
    generating an adapted model, using input speech from a new speaker to train said adapted model, while using said set of basis vectors to constrain said adapted model such that said adapted model lies within said eigenspace; and
enhancing said adapted model by extracting model parameters from said adapted model and adjusting at least some of said parameters based on said input speech from said new speaker.

27. A method for performing speaker adaptation or normalization comprising the steps of:

representing a plurality of training speakers as first sets of transformation matrices together with a model to which the transformation matrices are applied;
    constructing an eigenspace to represent said plurality of training speakers as a population by providing a set of models for said training speakers, representing said set of models as first vectors of a first predetermined dimension and performing dimensionality reduction upon said first sets of transformation matrices to generate a set of basis vectors of a second dimension substantially smaller than said first predetermined dimension that define said eigenspace;
    generating a second set of transformation matrices using input speech from a new speaker while using said set of basis vectors to constrain said second set of transformation matrices such that said second set lies within said eigenspace.

UNITED STATES PATENT AND TRADEMARK OFFICE
CERTIFICATE OF CORRECTION

PATENT NO. : 6,343,267 B1
APPLICATION NO. : 09/148753
DATED : January 29, 2002
INVENTOR(S) : Roland Kuhn et al.

It is certified that error appears in the above-identified patent and that said Letters Patent is hereby corrected as shown below:

31. A method for performing speaker adaptation or normalization comprising the steps of:

constructing an eigenspace to represent a plurality of training speakers as a population by providing a set of first models for said training speakers and performing dimensionality reduction upon said set of first models to generate a set of basis vectors of a second dimension substantially smaller than said first predetermined dimension that define said eigenspace;
    generating an adapted model using input speech from a new speaker to train said adapted model, while using said set of basis vectors to constrain said adapted model such that said adapted model lies within said eigenspace,
    wherein said first models define a first probability distribution and said input speech defines observation data and wherein said adapted model is generated such that the product of said observation data and said first probability distribution is maximized.

Signed and Sealed this

Fifth Day of December, 2006

JON W. DUDAS
*Director of the United States Patent and Trademark Office*